(12) United States Patent
Chang et al.

(10) Patent No.: US 9,800,166 B2
(45) Date of Patent: Oct. 24, 2017

(54) POWER CONVERTER AND CONTROL METHOD THEREFOR

(71) Applicant: SEMICONDUCTOR COMPONENTS INDUSTRIES, LLC, Phoenix, AZ (US)

(72) Inventors: Yung-I Chang, Taipei (TW); Kuo-Hsien Huang, New Taipei (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/216,701

(22) Filed: Jul. 22, 2016

(65) Prior Publication Data

US 2017/0025966 A1    Jan. 26, 2017

Related U.S. Application Data

(60) Provisional application No. 62/196,294, filed on Jul. 23, 2015.

(51) Int. Cl.
*H02M 3/335*    (2006.01)
*H02M 1/00*    (2006.01)
*H02M 1/34*    (2007.01)

(52) U.S. Cl.
CPC .......... *H02M 3/33592* (2013.01); *H02M 2001/0009* (2013.01); *H02M 2001/0058* (2013.01); *H02M 2001/348* (2013.01); *Y02B 70/1475* (2013.01); *Y02B 70/1491* (2013.01)

(58) Field of Classification Search
CPC .......... H02M 3/33592; H02M 1/08; H02M 2001/0009
See application file for complete search history.

(56) References Cited

U.S. PATENT DOCUMENTS

| | | | |
|---|---|---|---|
| 6,995,991 B1 | 2/2006 | Yang et al. | |
| 7,440,298 B2 | 10/2008 | Yang | |
| 7,564,705 B2 | 7/2009 | Yang | |
| 8,134,851 B2 | 3/2012 | Soldano et al. | |
| 2014/0112030 A1* | 4/2014 | Fahlenkamp | H02M 3/33507 363/21.14 |
| 2015/0049522 A1* | 2/2015 | Iorio | H02M 3/33576 363/21.03 |
| 2015/0280584 A1* | 10/2015 | Gong | H02M 3/33515 363/21.13 |

FOREIGN PATENT DOCUMENTS

| | | |
|---|---|---|
| TW | 200701615 | 1/2007 |
| TW | 200810342 | 2/2008 |
| TW | 200828745 | 7/2008 |
| TW | 200841566 | 10/2008 |

* cited by examiner

*Primary Examiner* — Jue Zhang
(74) *Attorney, Agent, or Firm* — Robert F. Hightower

(57) ABSTRACT

A power converter and a control method therefor are provided. The power converter includes a transformer, synchronous rectifier and a control circuit. A primary side of the transformer receives an input voltage, and a secondary side of the transformer generates a sensing signal. The synchronous rectifier is coupled to the secondary side of the transformer. The control circuit receives the sensing signal and detects a changing slope of the sensing signal, and accordingly generates a control signal to control the synchronous rectifier to be turned on or turned off, so as to regulate an output voltage of the power converter.

14 Claims, 8 Drawing Sheets

POWER CONVERTER AND CONTROL METHOD THEREFOR

CROSS-REFERENCE TO RELATED APPLICATION

This application claims the priority benefits of U.S. provisional application Ser. No. 62/196,294, filed on Jul. 23, 2015. The entirety of the above-mentioned patent application is hereby incorporated by reference herein and made a part of this specification.

BACKGROUND

Field of the Invention

The invention is directed to a power converting technique and more particularly, to a flyback-based power converter with a synchronous rectifier (SR) and a control method for the flyback-based power converter.

Description of Related Art

Power conversion apparatuses are mainly used in converting high-level and unregulated input voltages into an output voltage with low levels and good stability that can be suitable for various types of electronic devices. In this way, the power conversion apparatus is widely applied to electronic devices, such as computers, office automation equipment, industrial control equipment and communication instruments.

Among various types of power converters, a flyback-based power converter is commonly used. A main part of the power converter is a transformer including a primary winding and a secondary winding. Generally, a synchronous rectifier may be disposed at a secondary side of the transformer. Through the control on the synchronous rectifier, the circuit at the secondary side of the transformer may be turned on or turned off, such that the energy stored at the primary winding may be adaptively converted into a current based on Lenz's law to charge output capacitors at the secondary side of the transformer, and thereby, a stable output voltage may be generated.

Therefore, how to control the synchronous rectifier adaptively to reduce power loss occurring during power conversion would be one of the important subjects that the persons skilled in the art have to pay attention to.

SUMMARY

The invention provides a power converter. The power converter includes a transformer, a synchronous rectifier and a control circuit. A primary side of the transformer receives an input voltage, and the secondary side of the transformer generates a sensing signal. The synchronous rectifier is coupled between the secondary side of the transformer and the ground voltage. The control circuit is coupled to the secondary side of the transformer and the synchronous rectifier, receives the sensing signal, detects a changing slope of the sensing signal and generates a control signal to control the synchronous rectifier to be turned off, so as to regulate an output voltage of the power converter.

The invention provides a control method for a power converter, wherein the power converter includes a transformer and a synchronous rectifier. The control method includes following steps. A sensing signal generated by a secondary side of the transformer according an input voltage received by a primary side of the transformer is received. A changing slope of the sensing signal is detected. And, A control signal is generated to control the synchronous rectifier to be turned off, so as to regulate an output voltage of the power converter.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to reducing unnecessary power consumption, the embodiments of the invention provide a power converter, which can calculate a changing slope of a sensing signal (e.g., a sensing current or a sensing voltage) provided at a secondary side of a transformer, so as to accurately determine a zero-crossing point of the secondary side current of the transformer. Thereby, an effect of reducing power loss can be achieved. The embodiments of the invention also provides a control method for the power converter.

Figure 1:
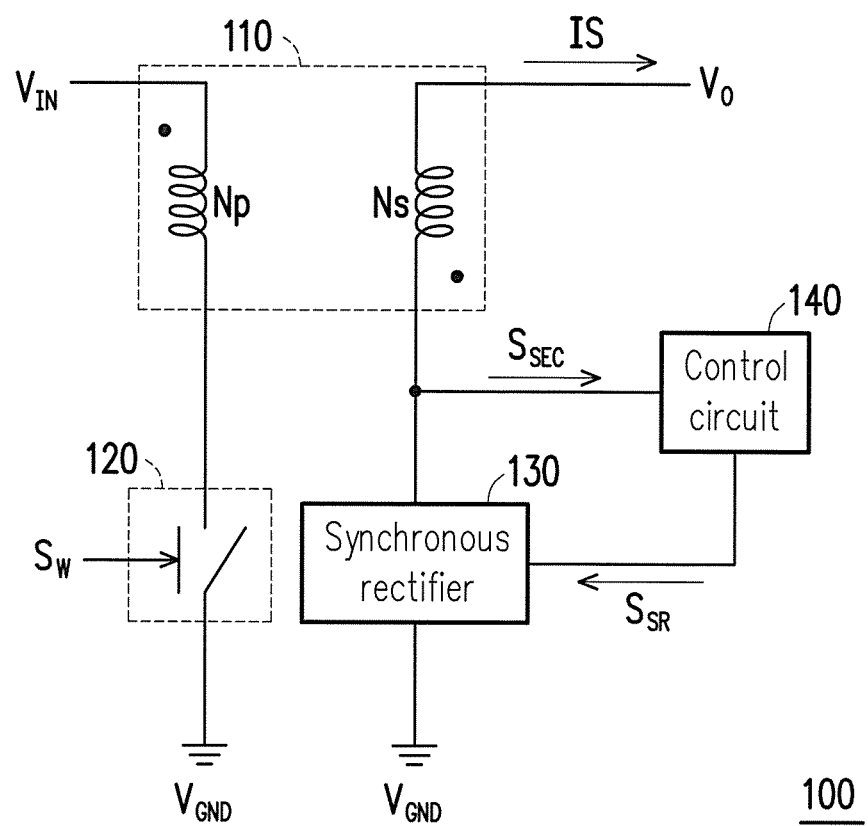
FIG. 1 is a schematic block diagram illustrating a power converter according to an embodiment of the invention.

FIG. 1 is a schematic block diagram illustrating a power converter according to an embodiment of the invention. Referring to FIG. 1, a power converter 100 is, for example, a flyback-based power conversion device, which includes a transformer 110, a switch unit 120, a synchronous rectifier 130 and a control circuit 140. A common-polarity terminal of a primary side of the transformer 110 receives an input voltage $V_{IN}$. The switch unit 120 is, for example, an N-type power switch. A first terminal of the switch unit 120 is coupled to an opposite-polarity terminal of the primary side of the transformer 110, a second terminal of the switch unit 120 is coupled to a ground voltage $V_{GND}$, and a control terminal of the switch unit 120 is configured to receive a switch signal $S_W$ for switching a pulse width modulation (PWM) signal. The common-polarity terminal of a secondary side of the transformer 110 provides a sensing signal $S_{SEC}$. The sensing signal $S_{SEC}$ may be a signal capable of linearly responding a current or a voltage generated by the secondary side of the transformer 110. For instance, the sensing signal $S_{SEC}$ can be an inductor current of the secondary side of the transformer 110, or the sensing signal $S_{SEC}$ can be a drain voltage of the synchronous rectifier 130. The synchronous rectifier 130 is coupled between the common-polarity terminal of the secondary side of the transformer 110 and the ground voltage $V_{GND}$. The control circuit 140 is coupled to the common-polarity terminal of the secondary side of the transformer 110 and the synchronous rectifier 130. The control circuit 140 receives the sensing signal $S_{SEC}$ and detects a changing slope of the sensing signal $S_{SEC}$ and accordingly generates a control signal $S_{SR}$ to control the synchronous rectifier 130 to be turned on and off. Thereby, through the mutual operation of the switch unit 120 and the synchronous rectifier 130, an output voltage $V_O$ of the power converter 100 is generated and regulated at an opposite-polarity terminal of the secondary side of the transformer 110.

In detail, in a normal operation of the power converter 100, the switch unit 120 is alternately turned on and turned off in response to the switch signal $S_W$, such that the power converter 100 continuously supplies the output voltage $V_O$, so as to meet the demand for power supply. When the switch unit 120 is turned on in response to the switch signal $S_W$, the input voltage $V_{IN}$ is electrically connected with a main coil Np at the primary side of the transformer 110, such that an inductor current of the main coil Np of the transformer 110 is linearly increased for energy storage. In the meantime, the control circuit 140 may control the synchronous rectifier 130 to be turned off through the control signal $S_{SR}$, such that no current flows through the secondary side of the transformer 110.

When the switch unit 120 is turned off in response to the switch signal $S_W$, the energy stored by the main coil Np at the primary side of the transformer 110 is transferred to a secondary coil Ns at the secondary side of the transformer 110 based on Lenz's law. In the meantime, the control circuit 140 may control the synchronous rectifier 130 to be turned on through the control signal $S_{SR}$, such that the energy transferred to the secondary coil Ns of the transformer 110 mat be converted into a secondary side current IS for charging an output capacitor of the power converter 100, so as to supply the output voltage $V_O$ stably.

Meanwhile, as the energy stored by the coil is gradually reduced, the secondary side current IS is gradually reduced according to a fixed slope, which causes the sensing signal $S_{SEC}$ to be gradually reduced according to a fixed slope different from that of the secondary side current IS. The sensing signal $S_{SEC}$ of the embodiment can be an inductor current (i.e., sensing current $I_{SEC}$) of the secondary side of the transformer 110. Due to the sensing current $I_{SEC}$ and the secondary side current IS reaching the zero-crossing point simultaneously, the control circuit 140 may determine a time that the secondary side current IS of the transformer 110 reaches the zero-crossing point (which is equivalent to the sensing signal $S_{SEC}$ reaching the zero-crossing point) by means of detecting the changing slope of the sensing signal $S_{SEC}$. In this way, the control circuit 140 may turn off the synchronous rectifier 130 preciously when the secondary side current IS of the transformer 110 reaches the zero-crossing point, so as to reduce power loss.

Figure 2:
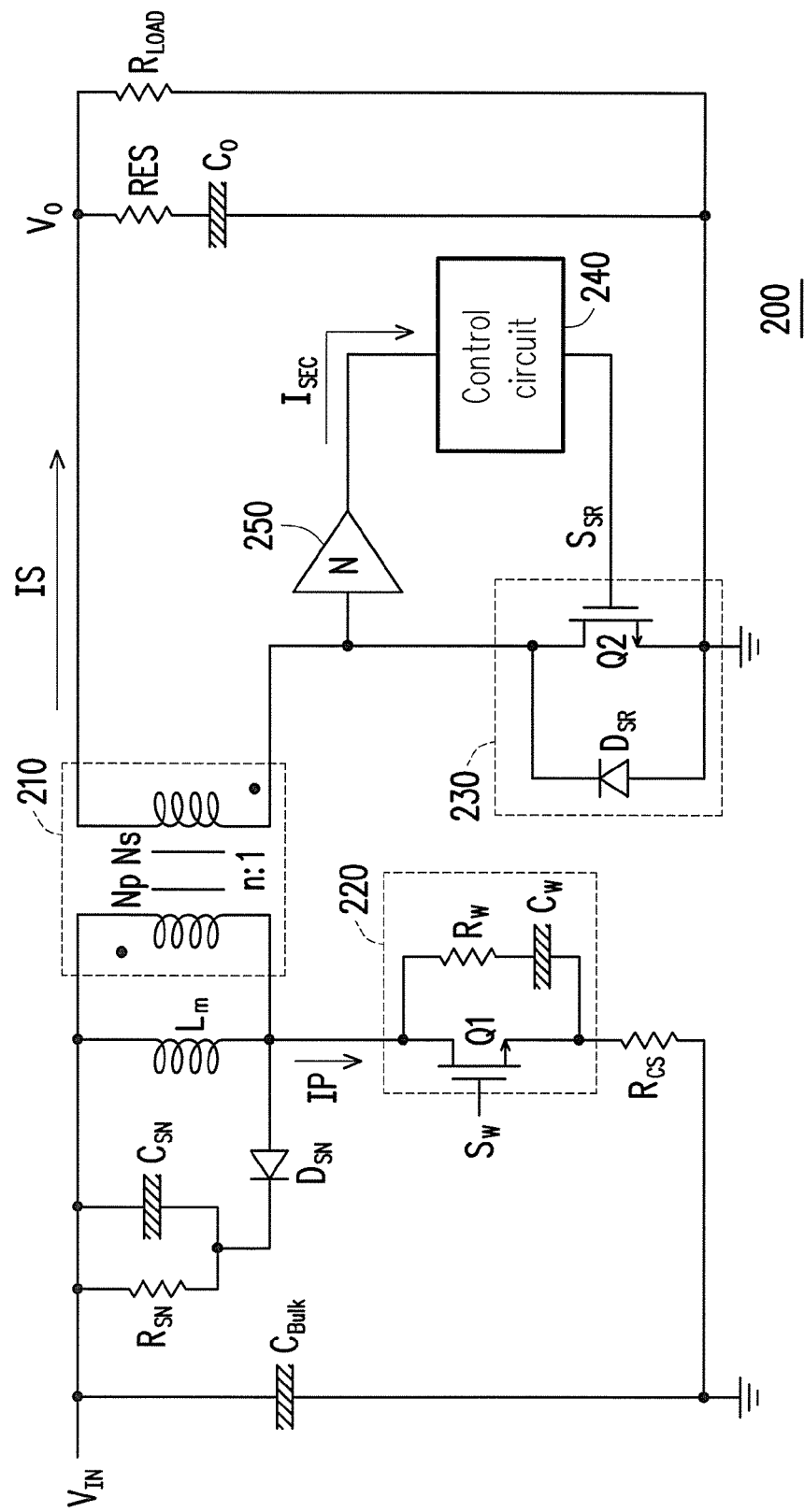
FIG. 2 is a schematic circuit diagram illustrating a power converter according to an embodiment of the invention.

In an embodiment, the sensing signal may be, for example, a sensing current generated by amplifying the secondary side current by using an amplifier. The control circuit may determine the time that the secondary side current of the transformer reaches the zero-crossing point according to the changing slope of the sensing current, so as to turn off the synchronous rectifier preciously at the zero-crossing point. For example, FIG. 2 is a schematic circuit diagram illustrating a power converter according to an embodiment of the invention. Referring to FIG. 2, a power converter 200 which is based on, for example, a flyback structure includes a transformer 210, a switch unit 220, a synchronous rectifier 230, a control circuit 240 and an amplifier 250. A primary side of the transformer 210 further includes a capacitor $C_{Bulk}$, a resistor $R_{SN}$, a capacitor $C_{SN}$, a diode $D_{SN}$, an inductor $L_m$ and a resistor $R_{CS}$. A secondary side of the transformer 210 further includes a resistor RES and output capacitor $C_O$. In the present embodiment, the switch unit 220 includes a transistor Q1, a resistor $R_W$ and a capacitor $C_W$. The synchronous rectifier 230 includes a transistor Q2 and a diode $D_{SR}$. The power converter 200 may receive an input voltage $V_{IN}$ and generate a primary side current IP at the primary side of the transformer 210. And, the switch unit 220 is alternately turned on and turned off, and the control circuit 240 may control the synchronous rectifier 230 to be correspondingly turned on and turned off, such that the secondary side of the transformer 210 may generate a secondary side current IS to charge the output capacitor $C_O$. Thereby, an output voltage $V_O$ is provided to a load (e.g., a load resistor $R_{LOAD}$)

Additionally, the amplifier 250 may be a circuit with a current minor capability, for example, to amplify the secondary side current IS to N times according to the requirement of the control circuit 240, so as to form a sensing current $I_{SEC}$ (where $I_{SEC}$=N*IS, and N is, for example, a positive integer greater than or equal to 1). The sensing current $I_{SEC}$ and the secondary side current IS may reach the zero-crossing point simultaneously due to a proportional relationship therebetween, and the control circuit 240 may calculate a time interval from a specific time point to the zero-crossing point for each of the sensing current $I_{SEC}$ and the secondary side current IS by means of detecting a changing slope of the sensing current $I_{SEC}$.

Figure 3:
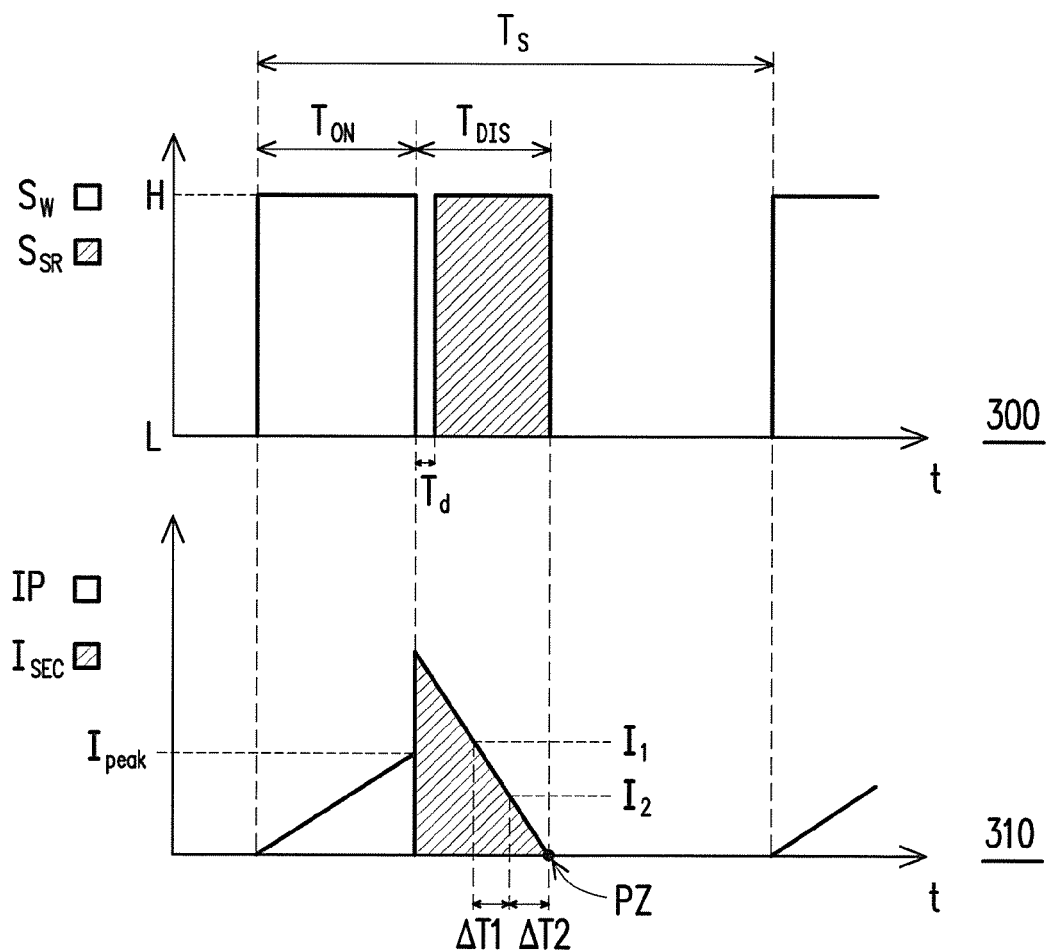
FIG. 3 is a signal timing chart of the power converter according to an embodiment of the invention.

FIG. 3 is a signal timing chart of the power converter according to an embodiment of the invention. Referring to FIG. 3, the upper timing chart 300 illustrates timing waveforms of a switch signal $S_W$ and a control signal $S_{SR}$. The vertical axis of the timing chart 300 represents logic levels of the switch signal $S_W$ and the control signal $S_{SR}$. The lower timing chart 310 illustrates timing waveforms of the primary side current IP and the sensing current $I_{SEC}$. The vertical axis timing chart 310 represents current values of the primary side current IP and the sensing current $I_{SEC}$. The horizontal axes of the timing charts 300 and 310 represent a synchronized time t, and examples are provided to describe the operations of the control circuit 240 in FIG. 2 with reference to FIG. 3.

Referring to FIG. 2 and FIG. 3 together, the power converter 200 may adjust the switch signal $S_W$ to alternately turn on and turn off the switch unit 220 by using a time period $T_S$ as a cycle. Meanwhile, the power converter 200 may detect the changing slope of the sensing current $I_{SEC}$ through the control circuit 240, so as to turn off the synchronous rectifier 230 immediately when the secondary side current IS of the transformer 210 reaches a zero-crossing point PZ. During an energy storage period $T_{ON}$ in FIG. 3, referring to the timing chart 300, the switch signal $S_W$ is at a high-logic level H, and the control signal $S_{SR}$ is at a low-logic level L. Namely, during the energy storage period $T_{ON}$, the power converter 200 may turn on the transistor Q1 in the switch unit 220 through the switch signal Sw. In the meantime, the control circuit 240 may turn off the transistor Q2 of the synchronous rectifier 230 through the control signal $S_{SR}$. In this case, referring to FIG. 2, the secondary side current IS becomes 0 (or approximate to 0) due to the transistor Q2 being turned off, such that a main coil Np of the transformer 210 receiving the input voltage $V_{IN}$ may store the energy. Thus, referring to the timing chart 310, during the energy storage period $T_{ON}$, the primary side current IP of the main coil Np flowing through the transformer 210 gradually and linearly raises up to a peak value $I_{peak}$.

Then, during a discharge period $T_{DIS}$, referring to the timing chart 300, the switch signal $S_W$ is at the low-logic level L, the control signal $S_{SR}$ is changed to the high-logic level H after a delay period $T_d$. In other words, during the discharge period $T_{DIS}$, the power converter 200 may turn off the transistor Q1 in the switch unit 220 through the switch signal $S_W$. In the meantime, the control circuit 240 may turn on the transistor Q2 of the synchronous rectifier 230 through the control signal $S_{SR}$, after the delay period $T_d$. In this case, referring to FIG. 2, the primary side current IP becomes 0 (or approximate to 0) due to the transistor Q1 being turned off, such that the energy stored by the main coil Np of the transformer 210 during the energy storage period $T_{ON}$ may be transferred to the secondary coil Ns at the secondary side of the transformer 210 for discharging, and the secondary side current IS generated. During the delay period $T_d$ before the transistor Q2 of the synchronous rectifier 230, the secondary side current IS may circulate through the diode $D_{SR}$ in the synchronous rectifier 230, such that after the transistor Q2 of the synchronous rectifier 230 is turned on, the secondary side current IS may circulate through the transistor Q2. Meanwhile, as the energy stored by the coil is gradually reduced, the secondary side current IS may be reduced down to zero according to a fixed slope.

Meanwhile, during the discharge period $T_{DIS}$, the control circuit 240 may calculate the changing slope of the sensing current $I_{SEC}$ respectively according to a sensing current $I_1$ of a first time point $T_1$, a sensing current $I_2$ of a second time point $T_2$ and a time difference $\Delta T1$ ($\Delta T1=T_1-T_2$) between the first time point $T_1$ and the second time point $T_2$. Due to the sensing current $I_{SEC}$ and the secondary side current IS reaching the zero-crossing point PZ simultaneously, the control circuit 240 may calculate a time difference $\Delta T2$ from the second time point $T_2$ to a time when the sensing current $I_{SEC}$ and the secondary side current IS reach the zero-crossing point PZ according to the changing slope of the sensing current $I_{SEC}$, so as to turn off the transistor Q2 of the synchronous rectifier 230 preciously by means of adjusting the control signal $S_{SR}$ to the low-logic level L at the zero-crossing point PZ of the secondary side current IS.

To be more specific, through derivation based on the declining changing slope $I_{sec\_SLOPE}$ of the secondary side current IS within the discharge period $T_{DIS}$ combination of a secondary side current $IS_1$ at the first time point $T_1$ and a secondary side current $IS_2$ at the second time point $T_2$, Formula (1) as follow may be obtained:

$$\frac{1}{IS_{SLOPE}} \times IS_2 = \frac{\Delta T1}{IS_1 - IS_2} \times IS_2 = \frac{\Delta T1}{N \times (I_1 - I_2)} \times (N \times I_2) = \quad \text{Formula (1)}$$

$$\frac{1}{I_{SEC\_SLOPE}} \times I_2 = \Delta T2 \Rightarrow \frac{\Delta T1}{I_1 - I_2} = \frac{\Delta T2}{I_2 - I_P}$$

Referring to FIG. 3 and Formula (1) together, a gain N generated by the amplifier 250 may be offset in the formula derivation, and the sensing current IP of the zero-crossing point PZ is 0. Thus, the control circuit 240 may calculate the time difference $\Delta T2$ from the second time point $T_2$ to the zero-crossing point PZ by using Formula (1), so as to handle the timing of the zero-crossing point PZ. Accordingly, the control circuit 240 may adjust the control signal $S_{SR}$ to the low-logic level L immediately when the secondary side current IS of the transformer 210 reaches the zero-crossing point PZ, so as to turn off the transistor Q2 of the synchronous rectifier 230. Thereby, an effect of reducing power loss can be achieved.

Figure 4:
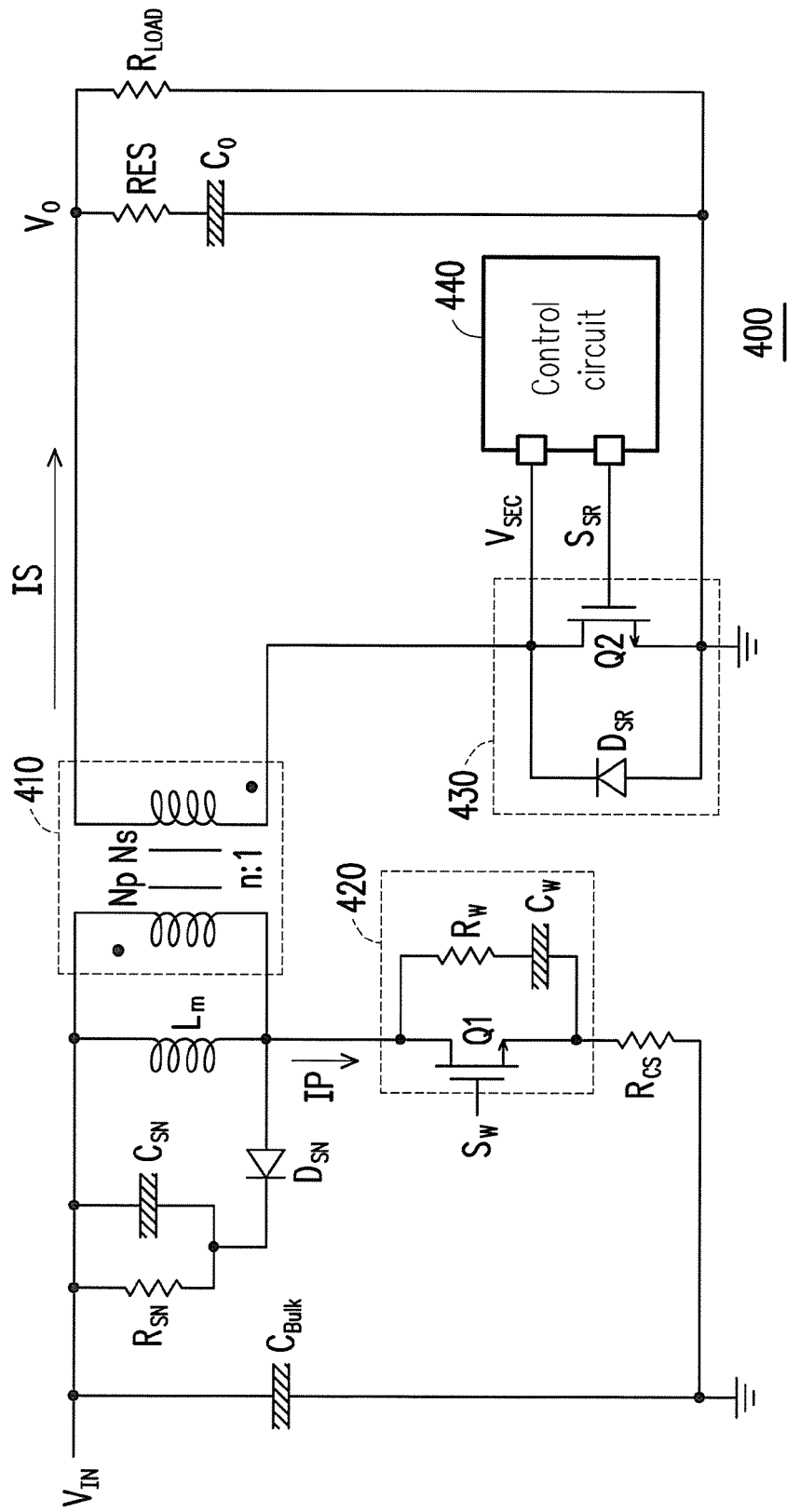
FIG. 4 is a schematic circuit diagram illustrating a power converter according to an embodiment of the invention.

In an embodiment, the sensing signal may be, for example, a sensing voltage generated at the common-polarity terminal of the secondary side of the transformer. The control circuit determine the time that the secondary side current of the transformer reaches the zero-crossing point according to the changing slope of the sensing voltage, so as to turn off the synchronous rectifier preciously at the zero-crossing point. For example, FIG. 4 is a schematic circuit diagram illustrating a power converter according to an embodiment of the invention. Referring to FIG. 4, a power converter 400 a power converter 200 which is based on, for example, a flyback structure includes a transformer 410, a switch unit 420, a synchronous rectifier 430 and a control circuit 440. A primary side of the transformer 410 further includes a capacitor $C_{Bulk}$, a resistor $R_{SN}$, a capacitor $C_{SN}$, a diode $D_{SN}$, an inductor $L_m$ and a resistor $R_{CS}$. A secondary side of the transformer 410 further includes a resistor RES and an output capacitor $C_O$. In the present embodiment, the switch unit 420 includes a transistor Q1, a resistor $R_W$ and a capacitor $C_W$. The synchronous rectifier 430 includes a transistor Q2 and a diode $D_{SR}$. A portion of the aforementioned elements of the present embodiment are the same or similar to those in the embodiment above and thus, the related details will not be repeated.

The sensing signal $S_{SEC}$ of the embodiment can be a drain voltage (i.e., sensing voltage $V_{SEC}$) of the synchronous rectifier 130. Being different from the embodiment above, due to the sensing voltage $V_{SEC}$ generated at the common-polarity terminal of the secondary side of the transformer 410 being proportional to the secondary side current IS, and both reaching the zero-crossing point simultaneously, the control circuit 440 may calculate a time interval from a specific time point to the zero-crossing point for the secondary side current IS by means of detecting a changing slope of the sensing voltage $V_{SEC}$.

Figure 5:
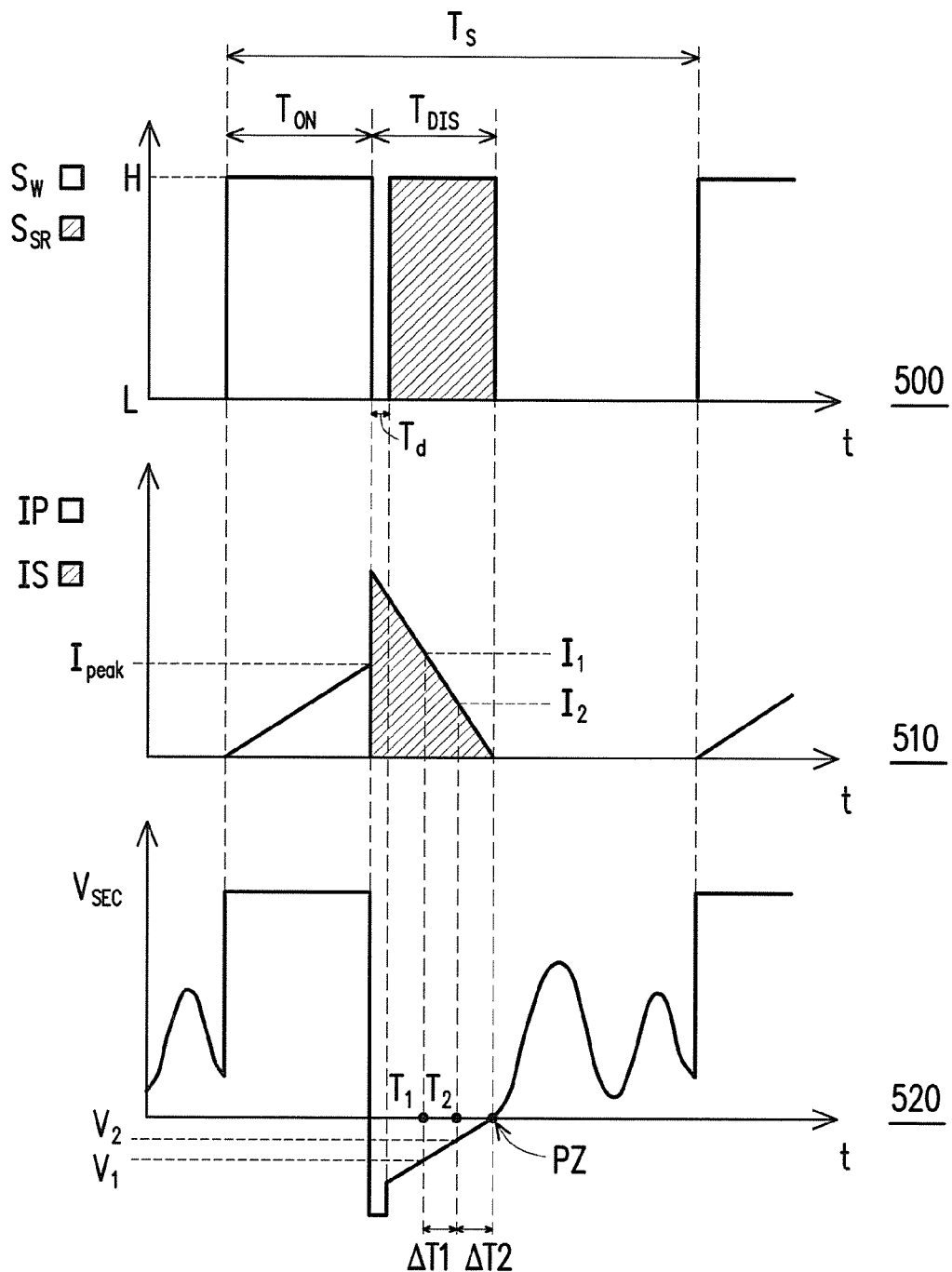
FIG. 5 is a signal timing chart of the power converter according to an embodiment of the invention.

FIG. 5 is a signal timing chart of the power converter according to an embodiment of the invention. Referring to FIG. 5, the upper timing chart 500 illustrates timing waveforms of the switch signal $S_W$ and the control signal $S_{SR}$. The vertical axis of the timing chart 500 represents logic levels of the switch signal $S_W$ and the control signal $S_{SR}$. The middle timing chart 510 illustrates timing waveforms of the primary side current IP and the secondary side current IS. The vertical axis of the timing chart 510 represents a current value of the primary side current IP and the secondary side current IS. The lower timing chart 520 illustrates timing waveforms of a timing waveform of the sensing voltage $V_{SEC}$. The vertical axis of the timing chart 520 represents a voltage level of the sensing voltage $V_{SEC}$. The horizontal axes of the timing charts 500, 510 and 520 represent the synchronized time t, and examples are provided to describe the operations of the control circuit 440 in FIG. 4 with reference to FIG. 5.

Referring to FIG. 4 and FIG. 5 together, the power converter 400 may adjust the switch signal $S_W$ to alternately turn on and turn off the switch unit 420 by using a time period $T_S$ as a cycle. Meanwhile, the power converter 400 may detect the changing slope of the sensing voltage $V_{SEC}$ through the control circuit 440, so as to turn off the synchronous rectifier 430 immediately when the secondary side current IS of the transformer 410 reaches the zero-crossing point PZ. During an energy storage period $T_{ON}$ in FIG. 5, referring to the timing chart 500, the switch signal $S_W$ is at a high-logic level H, and the control signal $S_{SR}$ is at a low-logic level L. Namely, during the energy storage period $T_{ON}$, the power converter 400 may turn on the transistor Q1 in the switch unit 420 through the switch signal Sw. In the meantime, the control circuit 440 may turn off the transistor Q2 in the synchronous rectifier 430 through the control signal $S_{SR}$. In this case, referring to FIG. 4, the secondary side current IS becomes 0 (or approximate to 0) due to the transistor Q2 being turned off, such that a main coil Np of the transformer 410 receiving the input voltage $V_{IN}$ may store the energy. Thus, referring to the timing chart 510, during the energy storage period $T_{ON}$, the primary side current IP of the main coil Np flowing through the transformer 410 gradually and linearly raises up to a peak value $I_{peak}$.

Then, during a discharge period $T_{DIS}$, referring to the timing chart 500 the switch signal $S_W$ is at the low-logic level L, the control signal $S_{SR}$ is changed to the high-logic level H after a delay period $T_d$. In other words, during the discharge period $T_{DIS}$, the power converter 500 may turn off the transistor Q1 in the switch unit 420 through the switch signal $S_W$. In the meantime, the control circuit 540 may turn on the transistor Q2 of the synchronous rectifier 530 after the delay period $T_d$. In this case, referring to FIG. 4, the primary side current IP becomes 0 (or approximate to 0) due to the transistor Q1 being turned off, such that the energy stored by the main coil Np of the transformer 410 during the energy storage period $T_{ON}$ may be transferred to the secondary coil Ns at the secondary side of the transformer 410 for discharging, and the secondary side current IS is generated. Meanwhile, referring to the timing chart 510, as the energy stored by the coil is gradually reduced, the secondary side current IS may be reduced down to zero according to a fixed slope.

Meanwhile, during the discharge period $T_{DIS}$, the control circuit 440 may calculate the changing slope of the sensing current $I_{SEC}$ respectively according to a sensing voltage $V_1$ at the first time point $T_1$, a sensing voltage $V_2$ of the second time point $T_2$ and a time difference $\Delta T1$ ($\Delta T1=T_1-T_2$) between the first time point $T_1$ and the second time point $T_2$. Referring to the timing chart 510 and the timing chart 520, due to the sensing voltage $V_{SEC}$ and the secondary side current IS reaching the zero-crossing point PZ simultaneously, the control circuit 440 may calculate a time difference $\Delta T2$ from the second time point $T_2$ to a time when the sensing current $I_{SEC}$ and the secondary side current IS reach the zero-crossing point PZ according to the changing slope of the sensing current $I_{SEC}$, so as to turn off the transistor Q2 of the synchronous rectifier 430 preciously by means of adjusting the control signal $S_{SR}$ to the low-logic level L at the zero-crossing point PZ of the secondary side current IS.

To be more specific, through derivation based on the declining changing slope $V_{SEC\_SLOPE}$ of the sensing voltage $V_{SEC}$ within the discharge period $T_{DIS}$ in combination of the sensing voltage $V_1$ at the first time point $T_1$ and the sensing voltage $V_2$ at the second time, Formula (2) as follow may be obtained:

$$\frac{1}{V_{SEC\_SLOPE}} \times V_2 =$$

$$\frac{\Delta T1}{|V_1 - V_2|} \times V_2 = \frac{\Delta T1}{R_{SR} \times |IS_1 - IS_2|} \times (R_{SR} \times I_2) =$$

Formula (2)

-continued $$\frac{1}{IS_{SLOPE}} \times IS_2 = \Delta T2 \Rightarrow \frac{\Delta T1}{|V_1 - V_2|} = \frac{\Delta T2}{|V_2 - V_P|}$$

Referring to FIG. 5 and Formula (2) together, an equivalent resistance $R_{SR}$ caused by the synchronous rectifier 430 may be offset in the formula derivation, and the sensing voltage $V_p$ of the zero-crossing point PZ is 0. Thus, the control circuit 440 may calculate the time difference $\Delta T2$ between the second time point $T_2$ and the zero-crossing point PZ by using Formula (2), so as to handle the timing of the zero-crossing point PZ. Accordingly, the control circuit 440 may adjust the control signal $S_{SR}$ to the low-logic level L immediately when the secondary side current IS of the transformer 410 reaches the zero-crossing point PZ, so as to turn off the transistor Q2 of the synchronous rectifier 430. Thereby, the effect of reducing power loss can be achieved.

Figure 6:
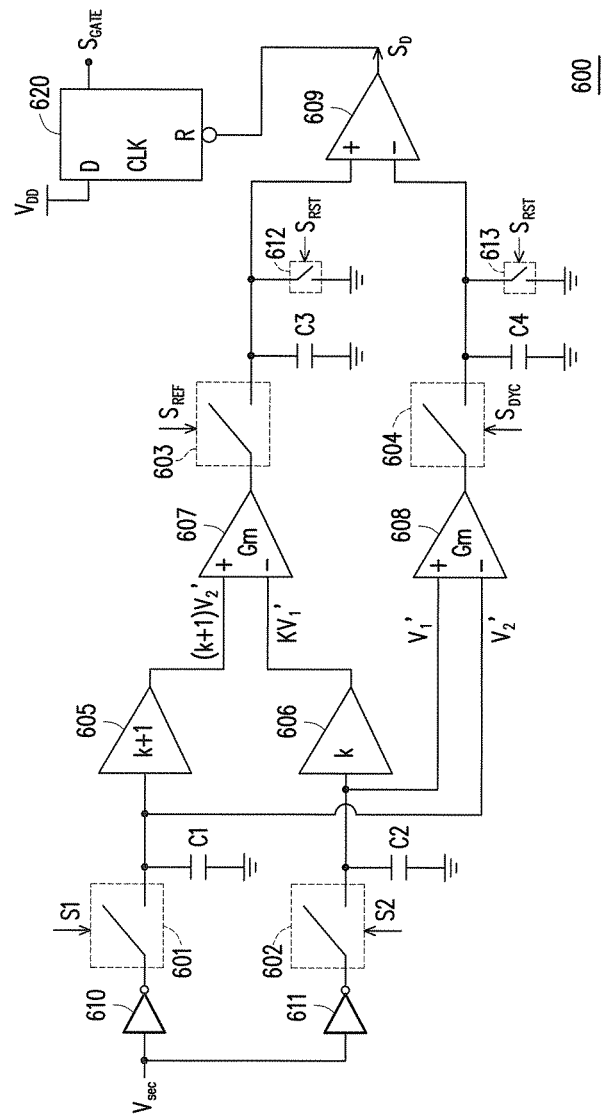
FIG. 6 is a schematic circuit diagram illustrating a control circuit according to an embodiment of the invention.

FIG. 6 is a schematic circuit diagram illustrating a control circuit according to an embodiment of the invention. Referring to FIG. 6, a control circuit 600 includes a first switch 601, a second switch 602, a third switch 603, a fourth switch 604, a first amplifier 605, a second amplifier 606, a first comparator 607, a second comparator 608, a third comparator 609, capacitors C1 to C4, a first inverter 610, a second inverter 611, a first reset switch 612 and a second reset switch 613. Input terminals of the first inverter 610 and the second inverter 611 receives the sensing voltage $V_{SEC}$, and output terminals of the first inverter 610 and the second inverter 611 output an inverted sensing voltage $V_{SEC}'$. A first terminal of the first switch 601 receives the sensing voltage $V_{SEC}'$, and a control terminal of the first switch 601 is coupled to a first switch signal S1. An input terminal of the first amplifier 605 is coupled to second terminal of the first switch 601, and the sensing voltage $V_{SEC}'$ is amplified by using a gain k+1 (k is a positive integer greater than or equal to 1). A first terminal of the second switch 602 receives the sensing voltage $V_{SEC}'$, and a control terminal of the second switch 602 is coupled to a second switch signal S2. An input terminal of the second amplifier 606 is coupled to a second terminal of the second switch 602, and the sensing voltage $V_{SEC}'$ is amplified by using a gain k. A non-inverting input terminal of the first comparator 607 is coupled to an output terminal of the first amplifier 605, and an inverting input terminal of the first comparator 607 is coupled to an output terminal of the second amplifier 606. A first terminal of the third switch 603 is coupled to an output terminal of the first comparator 607. A non-inverting input terminal of the second comparator 608 is coupled to the second terminal of the second switch 602, and an inverting input terminal of the second comparator 608 is coupled to the second terminal of the first switch 601. A first terminal of the fourth switch 604 is coupled to an output terminal of the second comparator 608. A non-inverting input terminal of the third comparator 609 is coupled to second terminal of the third switch 603, and an inverting input terminal of the third comparator 609 is coupled to second terminal of the fourth switch 604. The capacitors C1 to C4 are respectively coupled between the second terminals of the first switch 601 to the fourth switch 604 and the ground voltage $V_{GND}$. The first reset switch 612 and the second reset switch 613 are respectively coupled between the output terminals of the third switch 603 and the fourth switch 604 and the ground voltage $V_{GND}$, so as to be controlled by a reset signal to discharge the capacitors C3 and C4 for resetting the control circuit 600.

Figure 7:
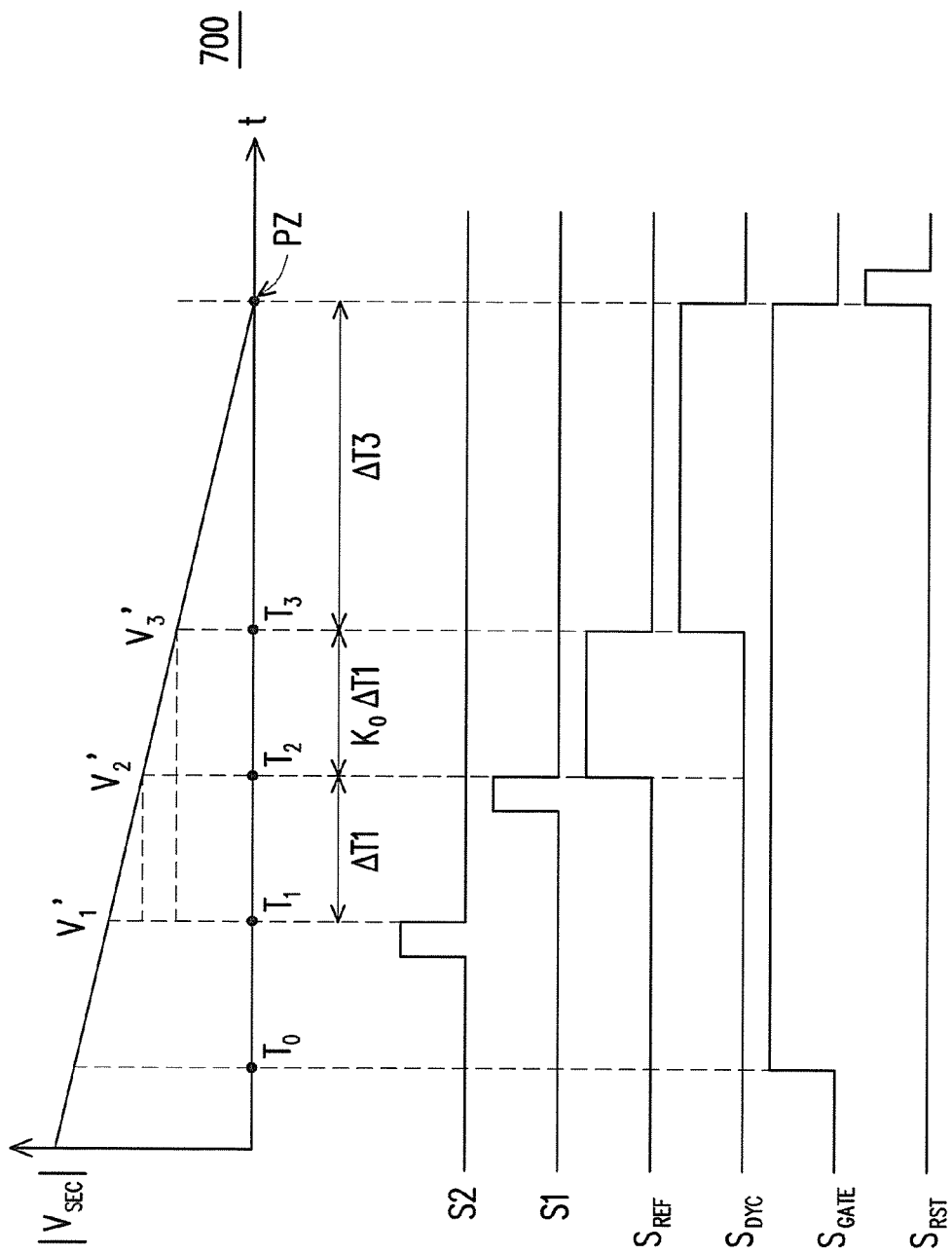
FIG. 7 is a signal timing chart of the power converter power converter according to an embodiment of the invention.

FIG. 7 is a signal timing chart of the power converter power converter according to an embodiment of the invention. Referring to FIG. 7, the upper timing chart 700 illustrates a timing waveforms of a voltage absolute value $|V_{SEC}|$ of the sensing voltage $V_{SEC}$ when entering the discharge period $T_{DIS}$. The vertical axis of the timing chart 700 represents an absolute value of the sensing voltage $V_{SEC}$, and the horizontal axis of the timing chart 700 represents a time t. The lower part of FIG. 7 illustrates timing waveforms of the switch signals S1 to S4 in synchronization with the time t along the horizontal axis of timing chart 700, and examples are provided to describe the operations of the control circuit 600 in FIG. 6 with reference to FIG. 7.

Referring to the timing chart 700 when entering the discharge period $T_{DIS}$, the voltage absolute value $|V_{SEC}|$ is gradually reduced down to the zero-crossing point PZ. Referring to FIG. 7, the control circuit 600 may generate the second switch signal S2 serving as a pulse signal at the first time point $T_1$ to turn on the second switch 602. Meanwhile, the sensing voltage $V_{SEC}$ with a negative phase may generate a positive-phase current through the second inverter 611 to charge the capacitor C2, such that a positive-phase sensing voltage $V_1'$ may be generated at the input terminal of the second amplifier 606 and at the non-inverting input terminal of the second comparator 608. In this case, the amplifier 606 may amplify the sensing voltage $V_1'$ for k times (i.e., $kV_1'$) and provided if to the inverting input terminal of the first comparator 607.

Then, the control circuit 600 may generate the first switch signal S1 serving as a pulse signal at the second time point $T_2$ to turn on the first switch 601. Meanwhile, the negative-phase sensing voltage $V_{SEC}$ may generate a positive-phase current through the first inverter 610 to charge the capacitor C1, such that a positive-phase sensing voltage $V_2'$ may be generated at the input terminal of the first amplifier 605 and at the inverting input terminal of the second comparator 608. In this case, the amplifier 605 may amplify the sensing voltage $V_2'$ for (k+1) times (i.e., (k+1) $V_2'$) and provide it to the non-inverting input terminal of the first comparator 607.

Meanwhile, after later than the second time point $T_2$, the control circuit 600 may turn on the third switch 603 and last for a period of a time difference $\Delta T1$ ($\Delta T1 = T_1 - T_2$) by means of adjusting the switch signal S3 to the high-logic level. In this case, the first comparator 607 may convert the sensing voltage ((k+1) $V_2'$) received by the non-inverting input terminal and the sensing voltage ($kV_1'$) received by the inverting input terminal into a sensing current which is Gm [(k+1) $V_2'-kV_1'$] at the output terminal of the first comparator 607 to charge the capacitor C3.

Thereafter, at a third time point $T_3$, the control circuit 600 may deduct a decrease ($V_1'-V_2'$) of the voltage absolute value $|V_{SEC}|$ passing through the time difference $\Delta T1$ from the sensing voltage $V_2'$ at the second time point $T_2$, so as to obtain a sensing voltage $V_3'(2V_2'-V_1')$. Meanwhile, the control circuit 600 may adjust the switch signal S3 to the low-logic level to turn off the third switch 603 being turned on and lasting for the time period of the time difference $\Delta T1$. In this case, the non-inverting input terminal of the third comparator 609 has a voltage which is $\Delta T1* \{Gm[(k+1) V_2'-kV_1']\}/C3$. Meanwhile, the control circuit 600 may start to turn on the fourth switch 604 through adjusting the switch signal S4 to the high-logic level at the third time point $T_3$, such that the inverting input terminal of the third comparator 609 has a voltage which is $\Delta T3*[Gm (V_1'-V_2')]/C4$. Therein, the time difference $\Delta T3$ is a time period of the fourth switch 604 being turned on. In a condition where the capacitances of the capacitor C3 and the capacitor C4 are set to be the same, and k=1, as the time length of the time difference $\Delta T3$ that the fourth switch 604 keeps being turned on is continuously increased and meets $\Delta T3*(V_1'-V_2')=\Delta T1*(2V_2'-V_1')=\Delta T1*V_3'$, a determination signal $S_D$ generated by an output terminal of the third comparator 609 may be changed from the high-logic level to the low-logic level, for example, such that the control circuit 600 may obtain the time length of the time difference $\Delta T3$ illustrate in FIG. 7, and Formula (3) as follow may be obtained:

$$\frac{\Delta T1}{V_1' - V_2} = \frac{\Delta T3}{2V_2' - V_1} \qquad \text{Formula (3)}$$

The control circuit 600 may serve the time interval measured from the time when the switch signal S4 being changed to the high-logic level to the time when the determination signal $S_D$ being changed to the low-logic level as the time difference $\Delta T3$, such that the time difference $\Delta T3$ from the third time point $T_3$ to the zero-crossing point PZ may be calculated at the third time point $T_3$ to handle the timing of the zero-crossing point PZ. Accordingly, the control circuit 600 may turn off the synchronous rectifier immediately when the secondary side current IS reaches the zero-crossing point PZ. Thereby, the effect of reducing power loss can be achieved.

Figure 8:
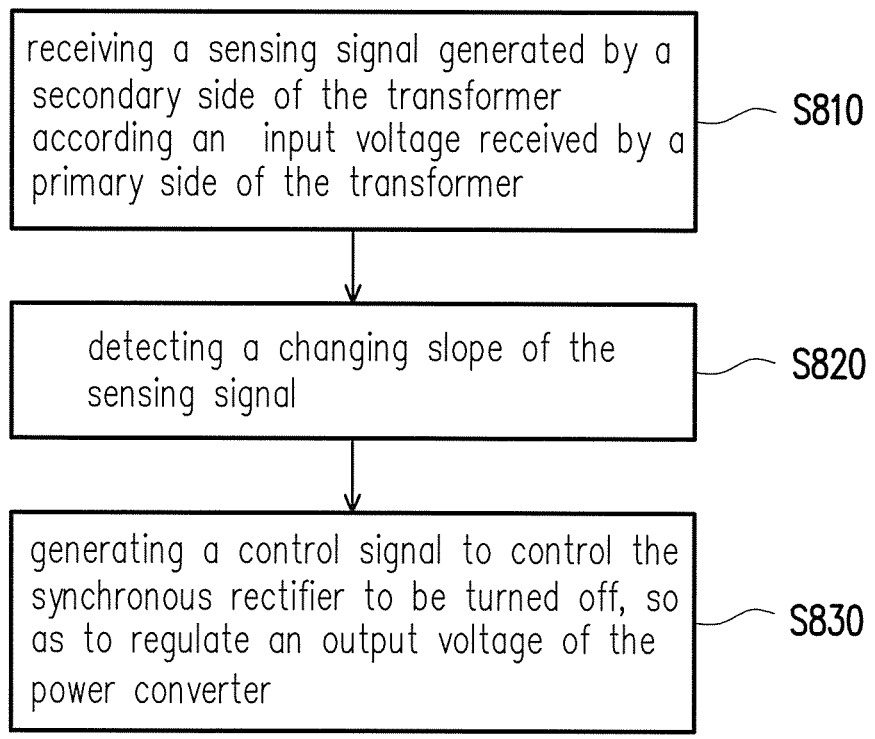
FIG. 8 is a flowchart illustrating a control method for the power converter according to an embodiment of the invention.

FIG. 8 is a flowchart illustrating a control method for the power converter according to an embodiment of the invention. The power converter includes a transformer and a synchronous rectifier, and the control method is implemented by a control circuit. The control method includes following steps. In step 810, the control circuit receives a sensing signal generated by a secondary side of the transformer according an input voltage received by a primary side of the transformer. In step 820, the control circuit detects a changing slope of the sensing signal. In step 830, the control circuit generates a control signal to control the synchronous rectifier to be turned on or turned off, so as to regulate an output voltage of the power converter.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power converter, comprising:
  a synchronous rectifier configured to be coupled to a secondary side of a transformer, the transformer having a primary side receiving an input voltage and the secondary side for generating a sensing signal; and
  a control circuit coupled to the synchronous rectifier, receiving the sensing signal from the secondary side, detecting a changing slope of the sensing signal according to a first time point and a second time point, determining a time length from the second time point to a time point that the sensing signal reaches a zero-crossing point according to the changing slope and generating a control signal to control the synchronous rectifier to be turned off according to the time length, so as to regulate an output voltage of the power converter.

2. The power converter according to claim 1, wherein the sensing signal comprises a sensing current, and during a discharge period of the secondary side of the transformer, the control circuit calculates the changing slope of the sensing current respectively according to the sensing current at the first time point, the sensing current at the second time point, and a time difference between the first time point and the second time point, so as to turn off the synchronous rectifier when a secondary side current of the transformer reaches the zero-crossing point.

3. The power converter according to claim 1, wherein the sensing signal comprises a sensing voltage, and during a discharge period of the secondary side of the transformer, the control circuit calculates the changing slope of the sensing voltage respectively according to the sensing voltage at the first time point, the sensing voltage at the second time point, and a time difference between the first time point and the second time point, so as to turn off the synchronous rectifier when a secondary side current of the transformer reaches the zero-crossing point.

4. The power converter according to claim 1, wherein the sensing signal is an inductor current of the secondary side of the transformer.

5. The power converter according to claim 1, wherein the sensing signal is a drain voltage of the synchronous rectifier.

6. The power converter according to claim 1, wherein the control circuit comprises:
 a first amplifier configured to receive a first inversed sensing signal of the sensing signal and to amplify the first inversed sending signal using a first gain to generate a first amplified signal; and
 a second amplifier configured to receive a second inversed sensing signal of the sensing signal and to amplify the second inversed sensing signal using a second gain to generate a second amplified signal, wherein the second gain is different from the first gain.

7. The power converter according to claim 6, wherein the control circuit further comprises:
 a first comparator, coupled to the first amplifier and the second amplifier, and configured to compare the first amplified signal and the second amplified signal to generate a first comparison result;
 a second comparator configured to compare the first inversed sensing signal and the second inversed sensing signal to generate a second comparison result; and
 a third comparator configured to compare the first comparison result and the second comparison result to generate a determination signal,
 wherein the determination signal is used to determine the time length from the second time point to the time point that the sensing signal reaches the zero-crossing point.

8. The control method according to claim 7, wherein the step of configuring the control circuit to determine the time length from the second time point to the time point that the sensing signal reaches the zero-crossing point according to the changing slope further comprises:
 configuring the control circuit to compare the first amplified signal and the second amplified signal to generate a first comparison result by a first comparator;
 configuring the control circuit to compare the first inversed sensing signal and the second inversed sensing signal to generate a second comparison result by a second comparator; and
 configuring the control circuit to compare the first comparison result and the second comparison result to generate a determination signal by a third comparator,
 wherein the determination signal is used to determine the time length from the second time point to the time point that the sensing signal reaches the zero-crossing point.

9. A control method for a power converter, wherein the power converter includes a synchronous rectifier configured to be coupled to a transformer, the control method includes:

configuring a control circuit to receive a sensing signal generated by a secondary side of the transformer according an input voltage received by a primary side of the transformer;
configuring the control circuit to detect a changing slope of the sensing signal according to a first time point and a second time point;
configuring the control circuit to determine a time length from the second time point to a time point that the sensing signal reaches a zero-crossing point according to the changing slope; and
configuring the control circuit to generate a control signal to control the synchronous rectifier to be turned off according to the time length, so as to regulate an output voltage of the power converter.

10. The control method according to claim 9, wherein the sensing signal comprises a sensing current, and
 the step for configuring the control circuit to detect a changing slope of the sensing signal further includes:
 configuring the control circuit to calculate the changing slope of the sensing current respectively according to the sensing current at the first time point, the sensing current at the second time point, and a time difference between the first time point and the second time point during a discharge period of the secondary side of the transformer, so as to turn off the synchronous rectifier when a secondary side current of the transformer reaches the zero-crossing point.

11. The control method according to claim 9, wherein the sensing signal comprises a sensing voltage, and
 the step for configuring the control circuit to detect a changing slope of the sensing signal further includes:
 configuring the control circuit to calculate the changing slope of the sensing voltage respectively according to the sensing voltage at the first time point, the sensing voltage at the second time point, and a time difference between the first time point and the second time point during a discharge period of the secondary side of the transformer, so as to turn off the synchronous rectifier when a secondary side current of the transformer reaches the zero-crossing point.

12. The control method according to claim 9, wherein configuring the control circuit to receive the sensing signal includes configuring the control circuit to receive an inductor current of the secondary side of the transformer.

13. The control method according to claim 9, wherein configuring the control circuit to receive the sensing signal includes configuring the control circuit to receive a drain voltage of the synchronous rectifier.

14. The control method according to claim 9, wherein the step of configuring the control circuit to determine the time length from the second time point to the time point that the sensing signal reaches the zero-crossing point according to the changing slope comprises:
 configuring the control circuit to receive a first inversed sensing signal of the sensing signal and to amplify the first inversed sending signal using a first gain to generate a first amplified signal by a first amplifier, to receive a second inversed sensing signal of the sensing signal, and to amplify the second inversed sensing signal using a second gain to generate a second amplified signal by a second amplifier, wherein the second gain is different from the first gain.

* * * * *